W. O. SMITH & F. O. BRAY.
Car-Couplings.
No. 153,623.
Patented July 28, 1874.
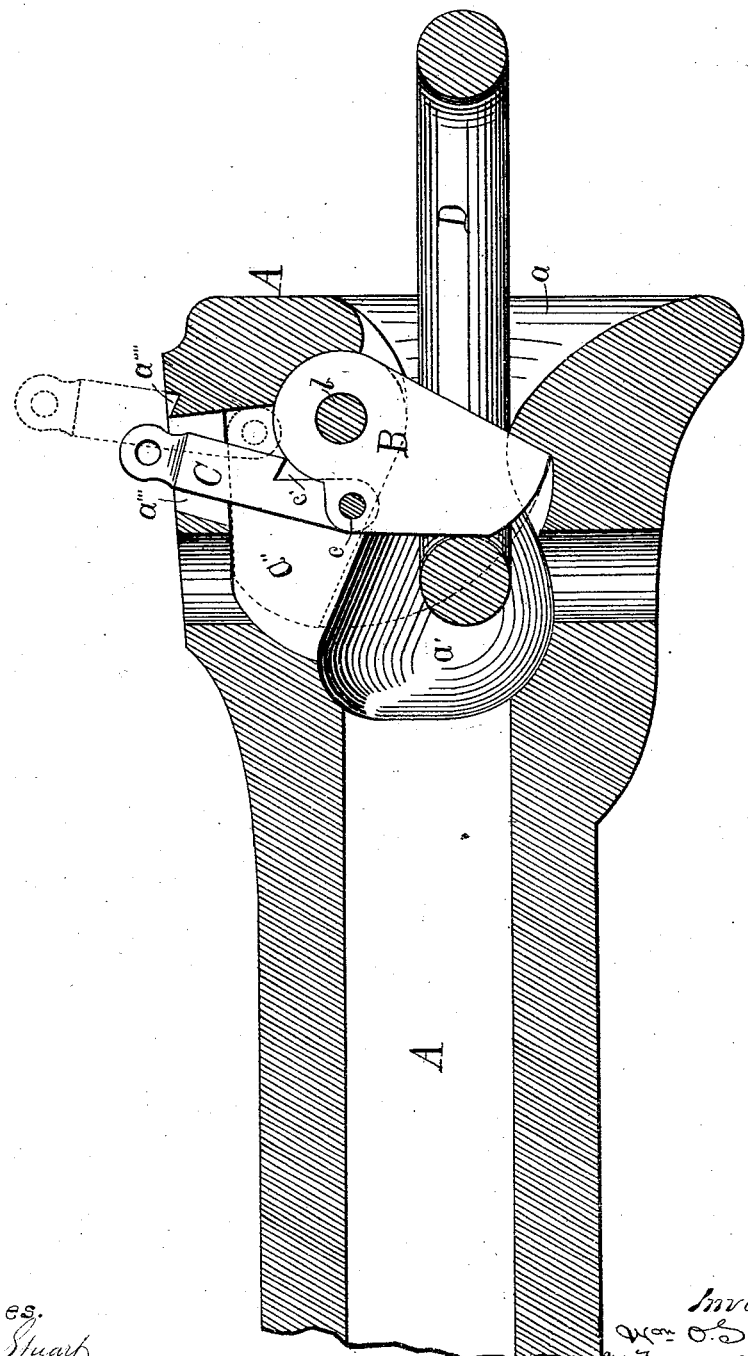

UNITED STATES PATENT OFFICE.

WILLIAM O. SMITH AND FRANK O. BRAY, OF NORWALK, OHIO.

IMPROVEMENT IN CAR-COUPLINGS.

Specification forming part of Letters Patent No. 153,623, dated July 28, 1874; application filed June 22, 1874.

*To all whom it may concern:*

Be it known that we, WILLIAM O. SMITH and FRANK O. BRAY, of Norwalk, in the county of Huron and State of Ohio, have invented certain new and useful Improvements in Draw-Bars and Car-Couplers; and we do hereby declare that the following is a full, clear, and exact description thereof, which will enable others skilled in the art to which it pertains to make and use the same, reference being had to the accompanying drawings, and to the letters of reference marked thereon, which form a part of this specification.

Our invention relates to devices for coupling railroad-cars; and the invention consists in a new and improved combination of devices for coupling cars automatically, and by means of which they may also be readily uncoupled without danger to the operative, all as hereinafter more fully set forth.

The accompanying drawing represents a longitudinal section view, showing the interior of the draw-bar and the coupling device pivoted therein.

Referring to the parts by letters, A represents the draw-bar, having an enlarged buffer-head, A'. The head A' is formed with a flaring mouth, $a$, and an enlarged interior recess or rounded chamber, $a'$. It is formed also with a recess, $a''$, and its upper central portion has a slot, $a'''$, passing through it, the forward wall of the slot being notched at its upper end, as shown at $a''''$. B is a dog or tongue pivoted by a bolt or spindle, $b$, within the recess $a''$. The upper portion of the tongue is rounded, so as to turn within a circular socket or portion of the recess, and the under portion is made straight on one side and rounded on the other, the straight portion fitting a correspondingly-notched portion of the recess $a''$. C is a bar or lever, the lower end of which is pivoted to the inner side of the dog by a bolt, $c$, its upper portion being passed through the slot $a'''$. $c'$ is a notch cut in the forward end of the lever C, corresponding to the notched recess formed in the front wall of the slot $a'''$. The upper end of the lever C is also provided with an eye for the reception of a chain or other suitable connection for operating the lever from the platform of the car. D is a coupling-link of ordinary construction. E is a vertical bolt-hole passed centrally through the draw-head, which may be used, when desired, for coupling with the ordinary coupling-pin.

The operation of the invention is as follows: The weight of the dog B will keep it in the position shown by full lines in the drawing. When it is desired to couple two adjacent cars, one end of the link is inserted through the mouth or opening $a$, and, coming in contact with the forward side of the dog B, will force the latter to turn upon its pivot within the recess $a''$ until raised a sufficient distance to permit of the passage of the link. When the end of the link has passed into the recess $a$, the dog B will then drop into its normal position, its lower forward end resting against the buffer, and effectually preventing the link being drawn out. The car having the link thus secured is moved to the one to be coupled, or vice versa, when the free end of the link will enter the other draw-head, and become secured in the same way automatically.

When it is desired to uncouple the cars, the lever C is raised by any suitable connecting mechanism, thereby raising the dog clear above the link, and permitting the latter to be freely withdrawn, when, by allowing the lever to descend again, or by removing the pressure from it, the dog B will fall again into position ready for coupling cars automatically.

When it is desired to retain the dog in an elevated position, so that the cars may come close together without coupling, or may become uncoupled while the engine is backing up the train, the operator raises the dog by the lever, and then pushes the latter forward, so that the notch $c'$ engages with the notched recess in the slot $a'''$, and thereby retains the dog in an elevated position, as shown by the dotted lines in the drawing.

The enlarged recess or rounded chamber $a$ within the draw-head gives the necessary freedom of motion to the link without effecting the position of the dog, which holds it in place.

Having thus described our invention, what we claim as new, and desire to secure by Letters Patent, is—

The draw-bar A A', having the recesses $a'$ $a''$ and notched slot $a'''$, in combination with the pivoted dog B and notched lever C, constructed to operate substantially as and for the purpose specified.

In testimony that we claim the foregoing as our own, we affix our signatures in presence of two witnesses.

WILLIAM O. SMITH.
FRANK O. BRAY.

Witnesses:
HAMILTON E. STEVENS,
B. P. SMITH.